United States Patent [19]

Kreftmeyer et al.

[11] Patent Number: 5,678,930
[45] Date of Patent: Oct. 21, 1997

[54] IMPROVED BEARING ASSEMBLY PERMITTING TRI-AXIAL MOVEMENT

[75] Inventors: Jimmy R. Kreftmeyer, Minooka; Theodore M. Clarke, Western Springs; Timothy A. Olson, Minooka, all of Ill.

[73] Assignee: Case Corporation, Racine, Wis.

[21] Appl. No.: 600,200

[22] Filed: Feb. 12, 1996

[51] Int. Cl.[6] .................................................. F16C 27/04
[52] U.S. Cl. ........................... 384/157; 384/222; 384/460
[58] Field of Search ............................... 384/157, 460, 384/222, 582, 536

[56] References Cited

U.S. PATENT DOCUMENTS

| 2,340,503 | 2/1944 | Barenyi | 384/222 |
| 2,465,785 | 3/1949 | Berno | 384/222 |
| 2,767,035 | 10/1956 | Von Euw | 384/222 |
| 4,407,372 | 10/1983 | Rozeboom | 172/572 |
| 4,724,910 | 2/1988 | Wheeler | 172/464 |
| 5,042,590 | 8/1991 | Bierl et al. | 172/572 |
| 5,267,619 | 12/1993 | Eversole | 172/572 |

OTHER PUBLICATIONS

Product Brochure for Deutz/Allis 2500/2600 Tandem Disk Harrows –Oct. 1994; 2 pages.
Product Brochure for AMCO –Portable Elevator Division, Dynamics Corporation of America –Est. Aug., 1994; 3 pages.
Product Brochure Krause 2200 Series Tandem Disc Harrow –Est. Jun., 1994; 2 pages.
Product Brochure for Taylor–Way Heavy–Duty Hydraulic Folding, Flexible Wheel Tandem Harrow –Est. Jul., 1994, 3 pages.

*Primary Examiner*—Lenard A. Footland
*Attorney, Agent, or Firm*—Jansson & Shupe, Ltd.

[57] ABSTRACT

A bearing assembly has first and second trunnions supporting a bearing and defining a trunnion pivot axis. In the improvement, each of the trunnions is mounted in and supported by a separate cushion member of annular shape. The assembly permits bearing pivoting about the trunnion pivot axis (i.e., about the X axis) and the cushion members permit limited freedom of movement of the trunnions in axes (i.e., the Y and/or Z axes) which are angular to the pivot axis. The new bearing assembly is ideal for use on an earth-working implement such as a disc harrow.

10 Claims, 5 Drawing Sheets

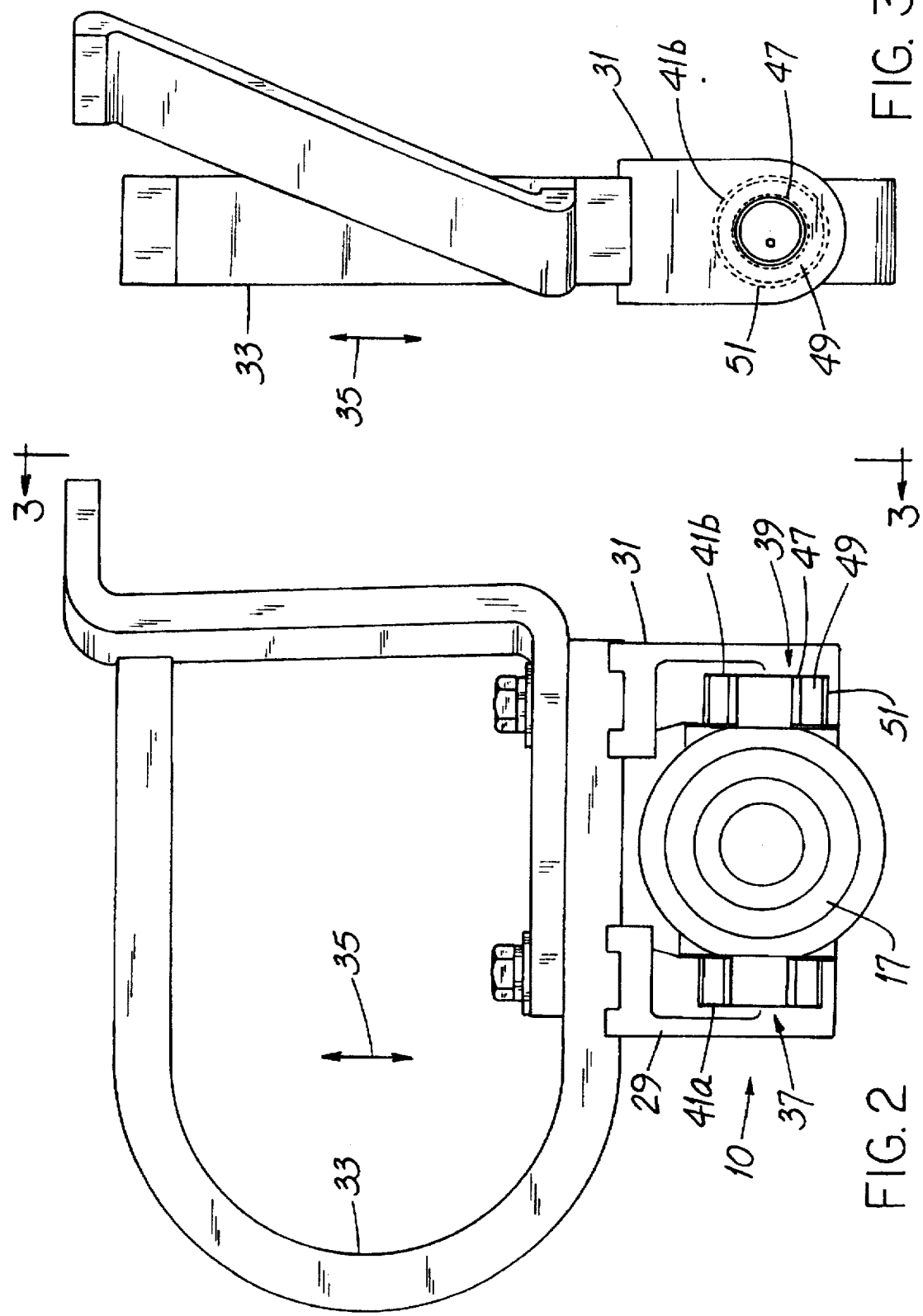

IMPROVED BEARING ASSEMBLY PERMITTING TRI-AXIAL MOVEMENT

FIELD OF THE INVENTION

This invention relates generally to bearings and, more particularly, to trunnion-mounted bearings.

Background of the Invention

Many types of machines use components which rotate with respect to a machine frame or to other machine components. The mechanical designer accommodates such rotation by using strategically-located bearings of a type and size suitable for the application. And if rotation is the only type of relative motion reasonably expected to occur, the bearings can be (and usually are) rigidly mounted in some type of bearing support.

Merely as an example, a bicycle wheel is mounted to a bicycle fork and is supported with respect to such fork by the wheel hub and bearings. Such bearings are rigidly mounted with respect to the fork and permit only one type of motion, namely, rotational motion about the wheel axle.

But other machine applications involving bearings may need more "forgiveness," i.e., the ability to permit at least some movement in addition to pure rotational movement about the bearing axis of rotation. For example, U.S. Pat. No. 4,407,372 (Rozeboom); U.S. Pat. No. 4,724,910 (Wheeler) and U.S. Pat. No. 5,042,590 (Bierl et al.) all involve what are commonly known as disc harrows, a type of earth-working implement. Implement discs are mounted on a shaft supported by bearings and, in turn, the bearings are rigidly-mounted on a C-shaped spring-like structure known as a standard. These arrangements rely upon the C-shaped spring structure, rather than upon the way the bearing itself is mounted, to afford limited movement, e.g., up and down.

U.S. Pat. No. 5,267,619 (Eversole) represents an improvement in the arrangements shown in the Rozeboom, Wheeler and Bierl et al. patents. In the disc harrow assembly shown in the Eversole patent, the bearing is mounted in a housing which has a pair of oppositely-protruding trunnions. Such trunnions are received in holes in a rigid support and lip, respectively. The trunnions and the holes are cooperatively sized to provide slight pivoting clearance therebetween. It is understood that earth-working equipment made by Taylor-Way, Krause Plow Corporation and AMCO (Portable Elevator Division of Dynamics Corporation of America) also use trunnion-mounted bearings.

With this arrangement, the shaft supporting the discs is not only free to rotate about the bearing axis of rotation, it is also afforded the ability to bend slightly if a disc is deflected upon striking a stump or the like. In that eventuality, the bearing housing pivots through a small arc of motion about the trunnion pivot axis, such axis being normal to the bearing axis of rotation. It is to be appreciated that while even small movement about the trunnion pivot axis helps reduce tool damage, the disclosed Eversole arrangement does not permit lateral translational movement as might be needed to reduce tool damage under certain impact conditions.

Literature published by Krause Plow Corporation states that its bearing is "encased in rubber to absorb shock." This may be an effort to provide some means for permitting translational movement. Aside from the possible manufacturing problems relating to encasing a bearing in rubber, such construction seemingly makes it more difficult to lubricate the bearing. And repair or replacement of such bearing may be problematic.

A new bearing assembly which overcomes some of the problems and shortcomings of earlier bearing assemblies would be an important advance in the art.

OBJECTS OF THE INVENTION

It is an object of the invention to provide an improved bearing assembly which overcomes some of the problems and shortcomings of the prior art.

Another object of the invention is to provide an improved bearing assembly which permits translational bearing movement.

Another object of the invention is to provide an improved bearing assembly of the trunnion type which permits translational bearing movement in substantially any direction normal to the trunnion pivot axis.

Yet another object of the invention is to provide an improved bearing assembly which is easy to manufacture.

Another object of the invention is to provide an improved bearing assembly which can be lubricated using a conventionally-mounted grease fitting.

Another object of the invention is to provide an improved bearing assembly which is easy to disassemble and repair.

Still another object of the invention is to provide an improved bearing assembly which is suitable for use with earth-working tools such as disc harrows and the like.

Another object of the invention is to provide an improved bearing assembly which reduces tool damage under a wide variety of impact conditions. How these and other objects are accomplished will become more apparent from the following descriptions and from the drawings.

SUMMARY OF THE INVENTION

The invention involves a bearing assembly of the type having first and second trunnions which support a bearing along a trunnion pivot axis. In the improvement, the first and second trunnions are supported by first and second cushion members, respectively. A trunnion and the bearing supported thereby is afforded limited freedom of movement in at least one axis angular to the pivot axis. When the bearing assembly is used on earth-working equipment such as a disc harrow, the resilience of the cushion members and the resulting freedom of movement makes damage to the equipment less likely.

Using the preferred configuration, there is freedom of movement in at least two axes angular to the pivot axis. In one exemplary embodiment, the cushion members are annular with the first cushion member being around the first trunnion and the second cushion member being around the second trunnion. Each of both trunnions is thereby permitted limited freedom of movement in two axes, each angular to the pivot axis. In the Cartesian coordinate system, the pivot axis is denominated as the X axis and is substantially horizontal and the other two axes are denominated as the Y and Z axes, respectively.

In other aspects of the invention, the first cushion member is interposed between the first trunnion and a first pivot mount. Similarly, the second cushion member is interposed between the second trunnion and a second pivot mount. Most preferably, each cushion member includes an annular layer of resilient material. And each cushion member also has an annular layer of rigid material interposed between the respective trunnion and the layer of resilient material and contacting the latter.

In yet other aspects of the invention, the layer of rigid material is a first layer of the respective cushion member and each such member further includes a second layer of rigid material contacting the resilient material. More specifically, the resilient material of a given cushion member is between the first and second layers of rigid material of such member.

When the bearing assembly is used in combination with an exemplary earth-working implement such as a disc harrow, the implement is supported by the bearing, the first and second trunnions are in first and second pivot mounts, respectively, and are supported by first and second cushion members, respectively. The pivot mounts are attached (preferably by bolting) to what is known as a "standard." In a disc harrow, the standard is often configured to act as a spring to help prevent damage to the discs.

In a specific embodiment, each standard-mounted pivot mount has a pocket formed in it and the annular cushion members are received in their respective pockets. And the first and second trunnions are received in the first and second cushion members, respectively. Since the cushion members are annular, it is convenient (as well as effective) to position each trunnion into the central opening of its respective cushion member.

Prior to the invention, a trunnion-mounted bearing was afforded freedom of movement only about the trunnion pivot axis, i.e., only about the X axis. The inventive assembly affords an opportunity for the bearing (and, thus, the earth-working tools supported by such bearing) to move in other directions if the tools encounter rocks or the like, impact with which tends to urge the tool along the Y and/or Z axes.

Other details of the invention are set forth in the following detailed description and in the drawings.

BRIEF DESCRIPTION OF THE DRAWINGS

FIG. 2 is an elevation view of a standard and bearing arrangement shown in FIG. 1 and taken along the viewing axis VA2 thereof. Cross-hatching of the cushion members is omitted for clarity.

FIG. 3 is a front elevation view of the standard and bearing arrangement of FIG. 2 taken along the viewing plane 2—2 thereof.

DETAILED DESCRIPTION OF PREFERRED EMBODIMENTS

Figure 1:
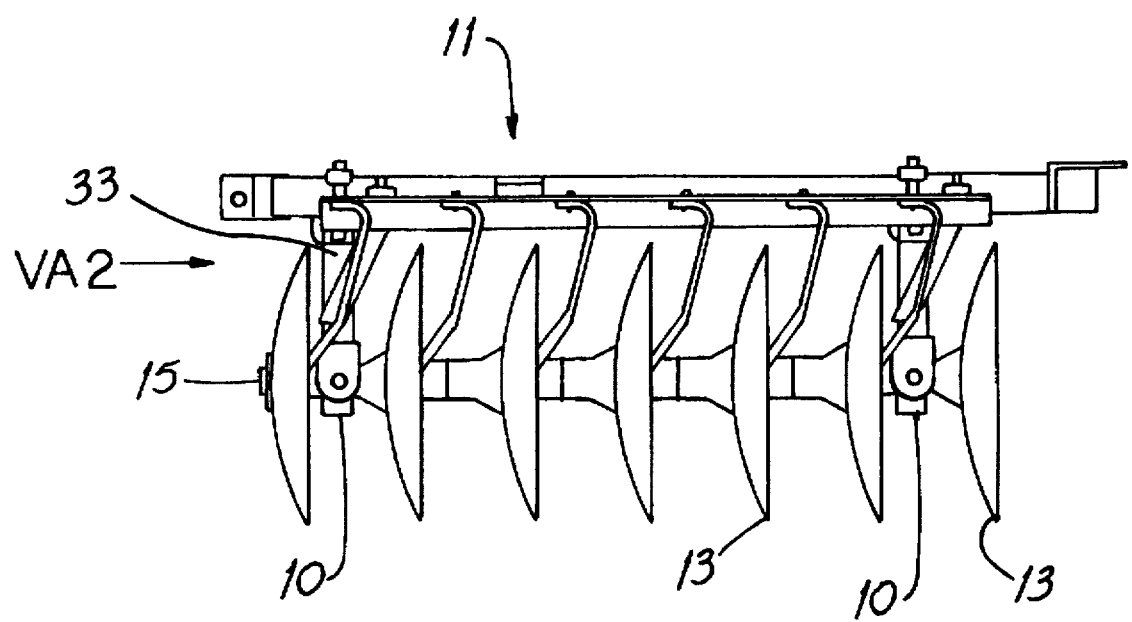
FIG. 1 is an elevation view of a subassembly of a disc harrow, an earth-working implement used in agriculture.
Figure 4:
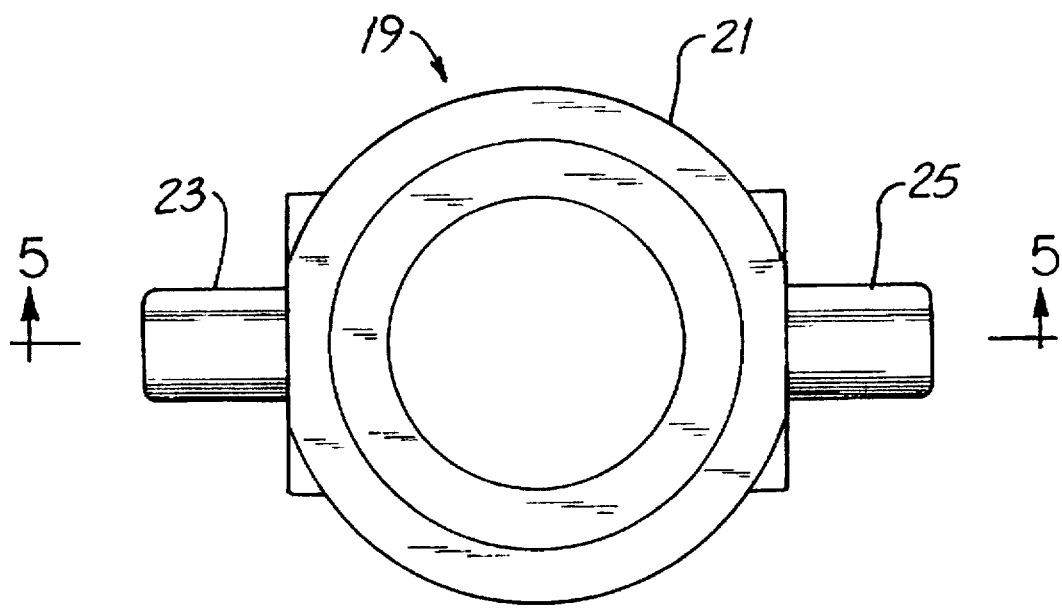
FIG. 4 is an elevation view of a bearing support device.
Figure 5:
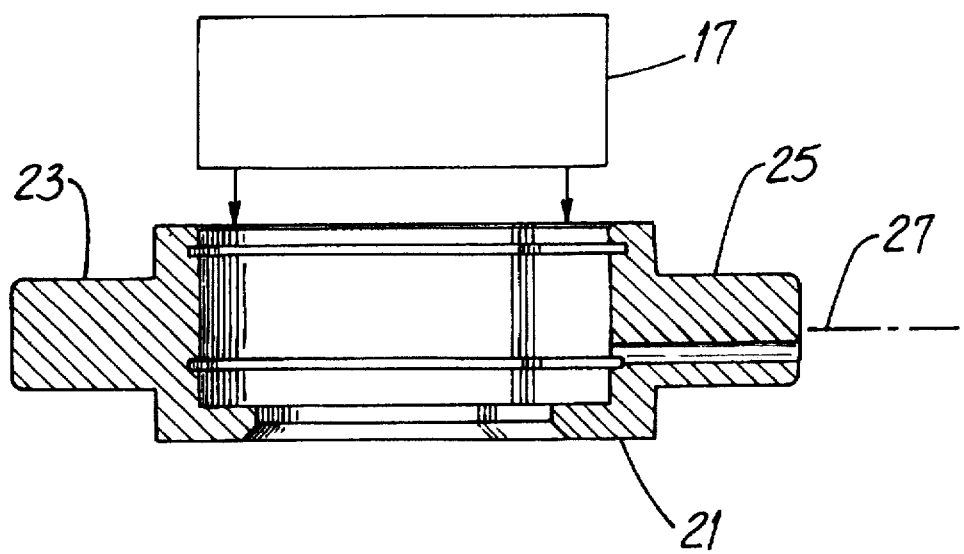
FIG. 5 is a section view of the device of FIG. 4 taken along the viewing plane 4—4 thereof.

Before describing the new bearing assembly 10, it will be helpful to have an understanding of an exemplary application on which such assembly 10 may be used. FIG. 1 shows a subassembly 11 of an earth-working implement known as a disc harrow. A complete implement may have two or four subassemblies mounted to a frame for towing behind a tractor. When towed, the discs 13 loosen and turn earth in preparation for crop planting.

Referring also to FIGS. 2, 3, 4 and 5, all of the discs 13 are mounted on a common shaft 15 which extends through a ball bearing 17 that forms a part of each of a pair of bearing assemblies 10. Each bearing assembly 10 includes a bearing support device 19 having a retention ring 21 and ring-supporting, cylinder-shaped first and second trunnions 23, 25 respectively. The trunnions 23, 25 protrude from the ring 21 along a trunnion pivot axis 27.

The trunnions 23, 25 are in first and second pivot mounts 29, 31, respectively, and the pivot mounts 29, 31 are bolted to a C-shaped spring-like structure known as a standard 33. As indicated by the arrows 35 in FIGS. 2 and 3, the standard 33 allows discs 13 to move up and down if an obstruction, e.g., a rock or stump, is encountered by a disc 13 in the soil being worked.

Referring now to FIGS. 4, 5, 6 and 7, details of the new bearing assembly 10 will not be set forth. The pivot mounts 29, 31 each have a generally-cylindrical pocket 37, 39, respectively, formed therein to receive first and second cushion members 41a, 41b, respectively. The outside diameter of the cushion members and the diameter of the pockets 37, 39 are cooperatively selected so that a cushion member 41 fits snugly into a pocket 37, 39. (The foregoing assumes that the cushion members 41a, 41b, are substantially identical to one another. But cushion members 41 and pockets 37, 39 having differing diameters are clearly within the scope of the invention.)

Each annular cushion member 41 has a cylindrical inner ring-like layer or liner 47 of rigid material, e.g., steel, a ring-like intermediate layer 49 of resilient material such as rubber or Buna-N and a ring-like outer layer or sleeve 51 of rigid material. The inside diameter of the inner liners 47 and the diameter of the respective trunnions 23, 25 are cooperatively selected so that a trunnion 23 or 25 may be received in the liner 47 with slight clearance. In that way, each trunnion 23, 25 is free to pivot with respect to such liner 47.

Figure 6:
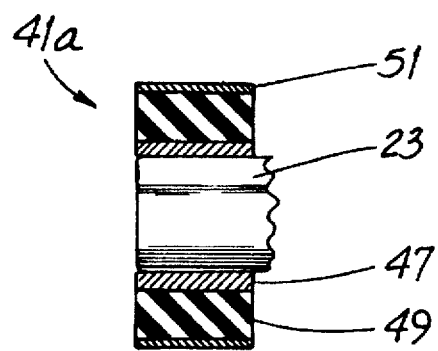
FIG. 6 is an elevation view of a trunnion of the bearing support device and, in section, of a cushion member associated with such trunnion. Parts are broken away.

As best seen in FIGS. 2 and 6, each cushion member 41 is around its respective trunnion 23, 25 and is interposed between such trunnion 23, 25 and the respective pivot mount 29, 31. The inner liner 47 and, to a certain extent, the outer sleeve 51 perform a "force-spreading" function. A force exerted on an inner liner 47 by a trunnion 23 or 25 is rather localized and, absent the liner 47, the trunnion 23 or 25 is likely to extrude into the resilient layer 49. The liner 47 spreads or distributes such force over a larger area of the intermediate resilient layer 49 and helps prevent such extrusion.

Reference to FIGS. 7 through 11, and the following explanation will help understand how the new bearing assembly 10 permits freedom of movement in ways not possible with prior art arrangements. The trunnion pivot axis 27 permits pivoting movement of the trunnions 23, 25 and bearing retention ring 21 with respect to the X axis shown in FIG. 9. Each cushion member 41 permits slight movement of its respective trunnion along the Y axis and/or along the Z axis. The Y and Z axes 55, 57, are angular with respect to the X axis (which is coincident with the trunnion pivot axis 27) and, most preferably, are normal to the trunnion pivot axis 27.

Figure 9:
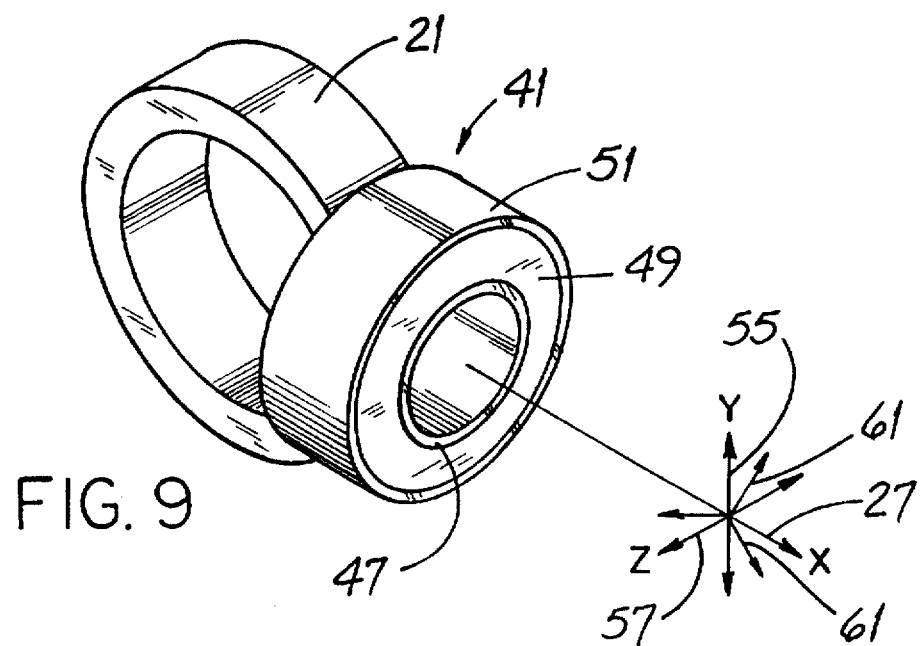
FIG. 9 is a simplified perspective view of a cushion member and the bearing retention ring.
Figure 8:
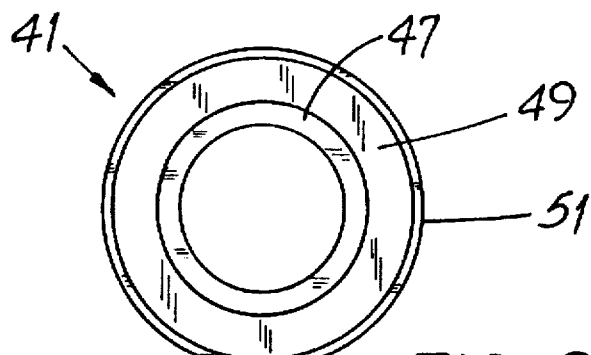
FIG. 8 is an elevation view in full representation of the cushion member of FIG. 7.
Figure 7:
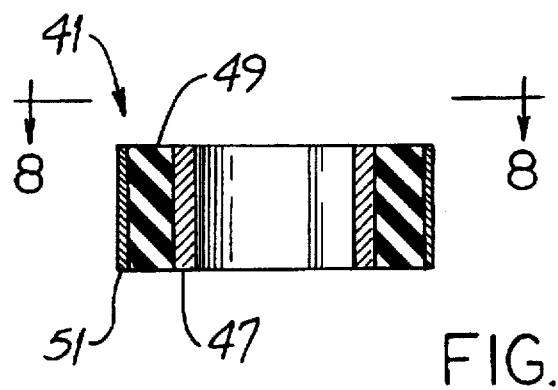
FIG. 7 is a section view of a cushion member.
Figure 11:
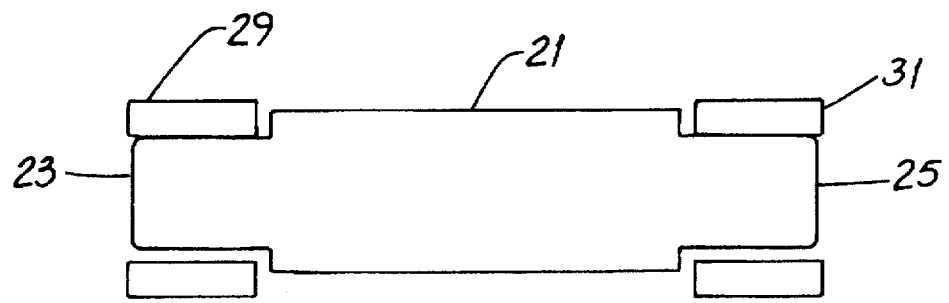
FIG. 11 is a simplified view showing how the new cushion members permit translational movement of a bearing support device.

As shown in FIG. 11 and as symbolized by the number and direction of the arrows 61 of FIG. 9, the new bearing assembly 10 permits translational movement of the bearing support device 19 (and the bearing 17 and shaft 15 supported thereby) along any one of an infinite number of axes normal to the trunnion pivot axis 27, i.e., the X axis. FIG. 11 shows translational movement along one of such axes, namely, the Z axis. This capability is highly desirable and reduces bearing wear-forces imposed on the discs 13 are rarely limited to those causing only up/down movement (as is accommodated by the standard 33) and/or those causing only pivoting movement of the device 19 about the trunnion axis 27.

Figure 10:
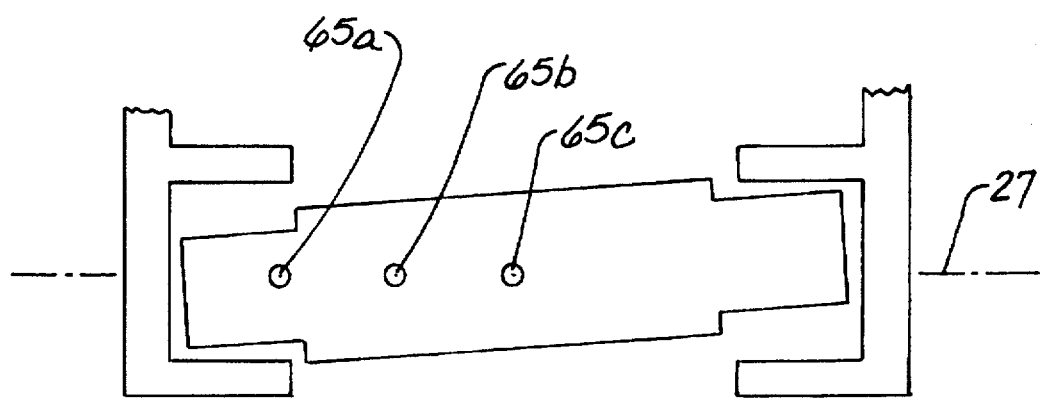
FIG. 10 is a simplified view showing how the new cushion members permit pivoting of a bearing support device.

And translational movement is not the only type of movement permitted by the new bearing assembly 10. As represented by FIG. 10, the device 19 is also free to pivot slightly about any axis 65$a$, 65$b$, or 65$c$ angular to the pivot mount axis 27. In FIG. 10, pivoting of the device 19 is represented to be about the axis 65$b$.

As used in this specification, the term "translational movement" means movement of a body, e.g., the bearing support device 19, in such a manner that all lines in the device 19 remain parallel to their original positions.

While the invention has been shown and described in connection with specific embodiments, it is to be understood clearly that such embodiments are exemplary and not limiting. As another example, the bearing support device 19 may be configured as a ring having pockets spaced 180° apart and the pivot mounts 29, 31 configured to have the trunnions 23, 25 protruding therefrom and into the pockets 37, 39. Such "inside out" arrangement is clearly contemplated by the invention.

What is claimed:

1. In a bearing assembly having first and second trunnions supporting a bearing, and wherein the trunnions define a pivot axis, the improvement wherein:

the first trunnion is supported by a first cushion member around the first trunnion;

the second trunnion is supported by a second cushion member around the second trunnion, and wherein:

the first cushion member is interposed between the first trunnion and a first pivot mount; and the second cushion member is interposed between the second trunnion and a second pivot mount, thereby permitting limited freedom of movement of both trunnions in two axes, each angular to the pivot axis.

2. The assembly of claim 1 wherein the first cushion member includes a layer of resilient material and a layer of rigid material interposed between the first trunnion and the layer of resilient material.

3. The assembly of claim 1 wherein:

each cushion member is annular; and each cushion member includes a layer of resilient material and a layer of rigid material contacting the layer of resilient material.

4. The assembly of claim 3 wherein the layer of rigid material is a first layer and each cushion member includes a second layer of rigid material contacting the resilient material.

5. The assembly of claim 4 wherein the resilient material is between the first and second layers of rigid material.

6. The assembly of claim 1 wherein:

the pivot axis is denominated as X axis and is substantially horizontal; and the two axes are denominated as Y and Z axis, respectively.

7. The bearing assembly of claim 1 in combination with an earth-working tool and wherein:

the tool is supported by the bearing.

8. In combination, an earth-working tool and a bearing assembly having first and second trunnions supporting a bearing, and wherein the trunnions define a pivot axis, the improvement wherein:

the first and second trunnions are in first and second pivot mounts, respectively, and each pivot mount has a pocket formed therein;

the first trunnion is supported by a first cushion member received in the pocket of the first pivot mount;

the second trunnion is supported by a second cushion member received in the pocket of the second pivot mount; and the tool is supported by the bearing.

9. The combination of claim 8 wherein:

each cushion member is annular; and the first and second trunnions are received in the first and second cushion members, respectively.

10. The combination of claim 8 wherein each cushion member includes a layer of resilient material and a layer of rigid material.

* * * * *